No. 850,012. PATENTED APR. 9, 1907.
W. F. JOGERST.
WIRE GUIDE FOR CHECK ROW PLANTERS.
APPLICATION FILED JULY 5, 1906.
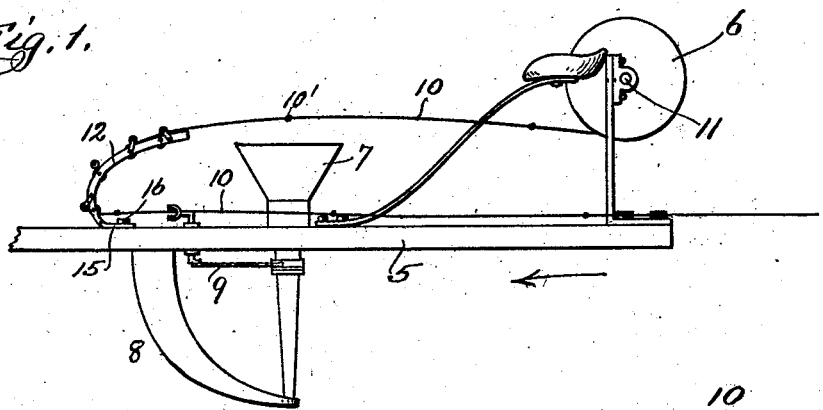

UNITED STATES PATENT OFFICE.

WILLIAM F. JOGERST, OF KENT, ILLINOIS.

WIRE-GUIDE FOR CHECK-ROW PLANTERS.

No. 850,012.      Specification of Letters Patent.      Patented April 9, 1907.

Application filed July 5, 1906. Serial No. 324,916.

*To all whom it may concern:*

Be it known that I, WILLIAM F. JOGERST, a citizen of the United States, residing at Kent, in the county of Stephenson and State of Illinois, have invented a new and useful Wire-Guide for Check-Row Planters, of which the following is a specification.

My invention relates to wire-guides for guiding the tripper-wire of check-row planters from the reel forward to the tripper mechanism during the first or initial trip across the field, particularly to the details of construction; and the objects of my invention are, first, to make a wire-guide which can easily and quickly be attached to or detached from the planter; second, to prevent the wire from ever getting displaced from the guide; third, to make a simple, durable, and inexpensive construction, and other objects to become apparent from the description to follow.

The first or initial trip across the field with a check-row planter in which a tripper-wire is used is usually made for the sole purpose of unreeling the wire and laying it across the field unless a device for guiding the wire through the tripper mechanism is provided. In some cases the distance across the field is great and consumes considerable time, which by the use of my invention is saved, because the planter is operated by the wire during this first trip across the field.

The wire-guide consists of a curved frame provided with a plurality of pairs of grooved wheels arranged along the length of the same and a foot-piece, by means of which it is attached to the planter. The wheels are placed so close together that it is impossible for the wire to fail to track over the wheels.

To describe my invention so that others versed in the art to which it pertains can understand it sufficiently to make and use the same, I have illustrated it on the accompanying sheet of drawings, forming a part of this specification, in which—

Figure 1 is a fragmentary side elevation of a check-row planter having a wire-guide embodying my invention attached thereto. Fig. 2 is a side elevation of the wire-guide detached and enlarged. Fig. 3 is a plan of the same enlarged and broken away, and Fig. 4 is section on line 4 4 of Fig. 3.

Similar reference characters refer to similar parts throughout the several views.

The wire-guide is secured to the frame 5, which also supports the reel 6, the seed-hopper 7, and the seed-drill 8. Any ordinary seed-dropping mechanism, as 9, is arranged to be operated by the wire 10, which is provided with the customary buttons 10′ at regular intervals.

The wire 10 is wound upon the reel 6, which is loosely mounted on shaft 11, and as the planter is driven forward, as indicated by the arrow in Fig. 1, the wire will unwind from the reel 6 and rest on the ground behind the planter. Instead of allowing the wire to pass directly from the reel to the ground it is led forward and through the wire-guide 12, which is located just in front of the tripping mechanism 9.

The guide 12 comprises the two flat parallel bars 13 and 14, bent in a curve, the lower end of bar 13 being provided with a horizontal foot 15, by means of which the guide is secured to the frame 5, as by a screw-bolt 16. The bars 13 and 14 are secured together and spaced apart by a plurality of bolts 17, on which are rotatably mounted the grooved wheels 18. Each wheel 18 has a companion grooved wheel 19, which is pivotally mounted on a suitable lug or extension 20 in such manner that the wire 10 will be prevented from leaving the groove in wheels 18 and 19.

It will be seen that this device is secured in position by a single bolt, so that it is only a matter of a few moments to either attach it to or detach it from a check-row-planter frame.

It will be understood that the device is capable of being modified in construction without departing from the scope of the invention as embodied in the appended claims.

Having thus fully described my invention, what I claim as new, and desire to secure by Letters Patent of the United States, is—

1. In a device of the class described, a rigid vertical frame and a plurality of pairs of grooved wheels rotatably mounted on said frame, said wheels of each pair having their peripheries in contact to prevent the wire from leaving the grooves.

2. In a device of the class described, a rigid vertical frame and a plurality of pairs of grooved wheels rotatably mounted on said frame in the same vertical plane the wheels of each pair having their peripheries in contact.

3. In a device of the class described, a rigid curved vertical frame provided with a foot to secure it in position, a plurality of pairs of grooved wheels mounted on said frame in the same vertical plane and means for detachably securing said frame to a planter.

4. In a device of the class described, a check-row planter comprising a suitable frame, a furrow-opener, a seed-dropper and a wire-reel, and a detachable wire-guide arranged to be secured in a vertical position on said frame.

In testimony whereof I have signed my name to this specification, in presence of two subscribing witnesses, this 16th day of May, 1906, at Lena, Illinois.

WILLIAM F. JOGERST.

Witnesses:
 JOHN REILAND,
 JOHN MARTINY, Jr.